United States Patent [19]
Bloemendaal et al.

[11] 3,780,922
[45] Dec. 25, 1973

[54] CARTRIDGE STRIPPER

[75] Inventors: John F. Bloemendaal; Willis L. Stockdale, both of Rochester, N.Y.

[73] Assignee: Eastman Kodak Company, Rochester, N.Y.

[22] Filed: Mar. 15, 1972

[21] Appl. No.: 234,795

[52] U.S. Cl..................... 226/92, 242/197, 156/584
[51] Int. Cl. ............................................. G03b 1/56
[58] Field of Search........................... 226/91, 92, 5; 156/584; 242/197

[56] References Cited
UNITED STATES PATENTS

| | | | |
|---|---|---|---|
| 2,484,880 | 10/1949 | Flood | 226/5 X |
| 3,266,797 | 8/1966 | Stievenart | 156/584 |
| 3,634,176 | 1/1972 | Covert | 156/584 |

*Primary Examiner*—Allen N. Knowles
*Attorney*—William T. French et al.

[57] ABSTRACT

Apparatus for use in removing a strip of film from a cartridge, which film is interwound with a strip of backing material. The invention obviates the need for breaking open or otherwise mutilating the cartridge by withdrawing the backing material through the cartridge exposure aperture to, in turn, withdraw the film strip by contact with the backing material. The apparatus comprises a film guide track means and means for holding the cartridge adjacent one end of the track. A film guide means is disposed between the cartridge and the end of the track. Means is provided whereby pulling the backing paper around the film guide means and the end of the track causes the film to be withdrawn from the cartridge and to be guided into the track.

19 Claims, 9 Drawing Figures

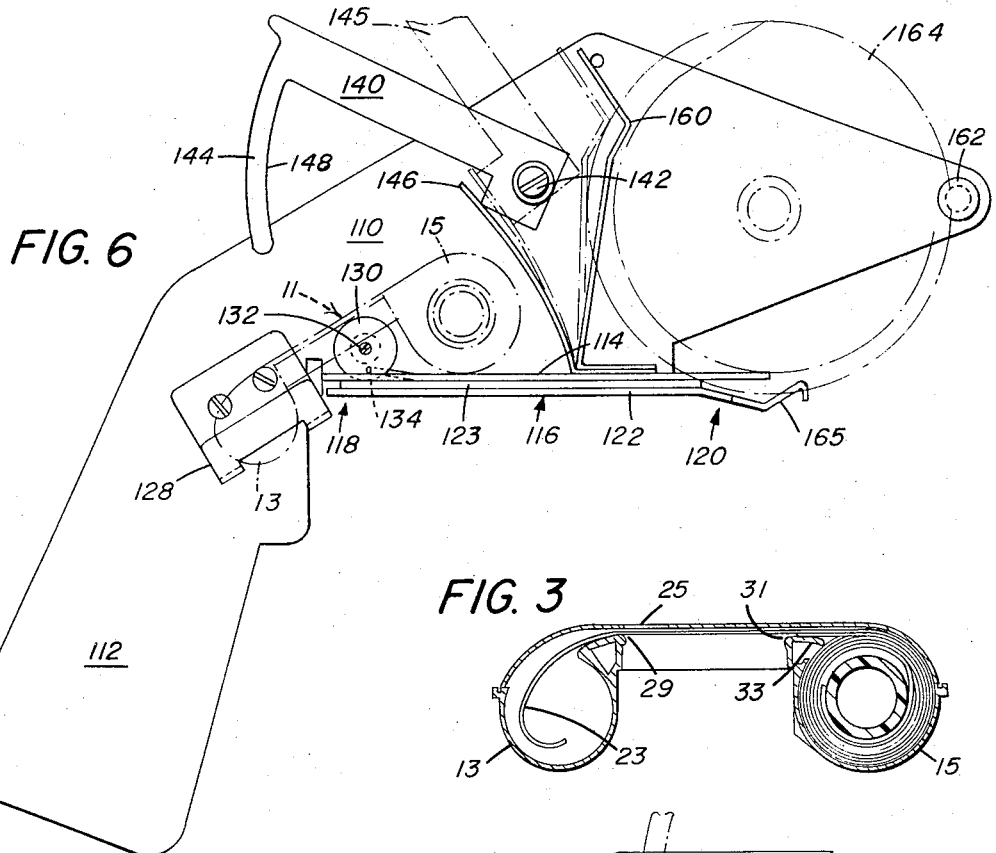
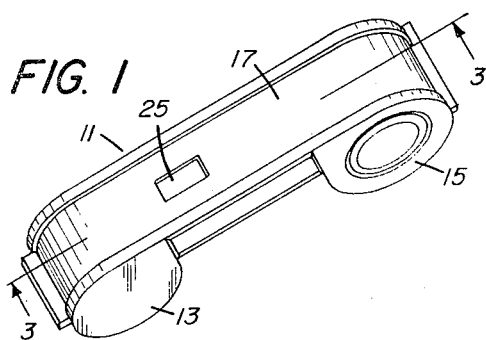
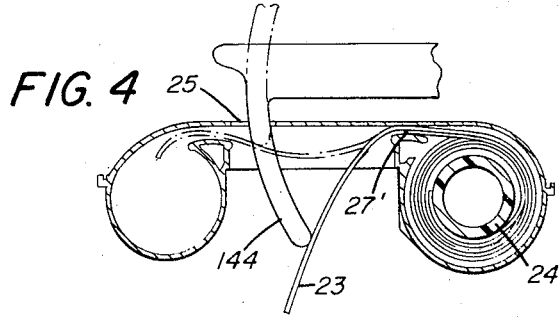
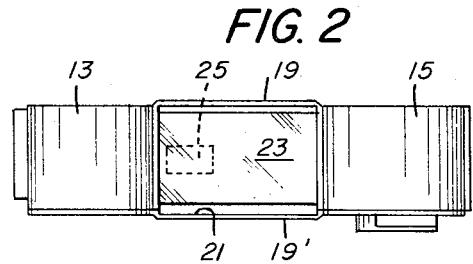
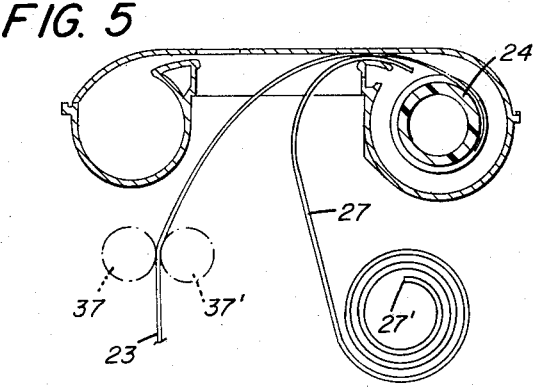

CARTRIDGE STRIPPER

BACKGROUND OF THE INVENTION

1. Field of the Invention

The invention relates to photographic film cartridges and, in particular, to the removal of exposed film from a film cartridge in preparation for photographic processing of the film.

2. Description Relative to the Prior Art

The development of the photographic art has, in recent years, been characterized by the increasing popularity of self-contained roll film cartridges. A typical such cartridge is described in U.S. Pat. No. 3,628,435 and includes interconnected takeup and supply chambers spaced at opposite ends of an exposure aperture. During use of such a cartridge in a camera, film and a superimposed backing strip are incrementally advanced from the supply chamber across the exposure aperture and into the takeup chamber. Successive areas of the film are thus sequentially exposed by the camera and stored within the takeup chamber to await photographic processing.

The processor is, however, faced with the task of removing the exposed film from the cartridge in order to photographically develop the exposed picture areas. Typically, the film is removed by fracturing or otherwise destroying the cartridge takeup chamber, and a device for use in such fracturing is disclosed in U.S. Pat. No. 3,411,682. It has been found, however, that the fracturing operation generates particles of cartridge debris which may become scattered about the work place and contaminate or even scratch the film. Jagged portions of the fractured cartridge may also present a hazard. These undesirable features become of increased importance when the cartridge to be opened contains film having a relatively small format. Some scratches and debris might go unnoticed upon a larger format whereas the same imperfection, if present upon a smaller format film, could become objectionable after the developed picture produced from the miniature format has been enlarged to standard size.

In copending U.S. application Ser. No. 234,797, entitled CARTRIDGE STRIPPING, and filed simultaneously herewith in the name of Evan A. Edwards, there is disclosed a new method and means for removing exposed photographic film from a film cartridge.

As disclosed in that copending application, it has been found that film interwound with a backing strip may be removed from a film cartridge having an unobstructed exposure aperture without fracturing or otherwise mutilating the cartridge. By dislodging a trailing portion of the backing strip from the exposure aperture and then withdrawing the backing strip from the cartridge takeup chamber via the exposure aperture, the film has been found to accompany the backing strip from the takeup chamber even though the film is not itself engaged. By positioning the trailing end of the film, prior to withdrawal, within a passageway formed in the cartridge takeup chamber, frictional contact between film and cartridge may be reduced and the instant system of film extraction may be practiced with a still further reduction of film damage.

SUMMARY OF THE INVENTION

It is therefore an object of this invention to provide novel apparatus for withdrawing a strip of film interwound with a strip of backing paper from a cartridge chamber according to the foregoing method. This apparatus, thus, comprises a film guide track means, means for holding the cartridge adjacent one end of the track means and film guide means disposed between the cartridge and the end of the track means. As the backing paper is pulled around the film guide means and the end of the track means the film is withdrawn from the cartridge and is guided into the track means.

More specifically, the present invention provides a photographic film cartridge stripper and reel loader arranged to remove exposed photographic film from a cartridge having a supply chamber and a takeup chamber disposed at opposite ends of an exposure aperture and connected by a back member which extends across the rear of the exposure aperture. The cartridge aperture has an unobstructed opening wider than the width of the film and the back member has a window opening therethrough. The supply and takeup chambers each have a web opening therefrom adjacent the back member into the aperture. The cartridge has a film backing paper interwound with the exposed film in the takeup chamber with only the backing paper extending across the aperture opening to the supply chamber. The cartridge stripper comprises a plate-like frame member having a hand grip at one extremity thereof. The frame member has a portion extending substantially perpendicular to the plate-like portion to form the upper portion of a film guide track having a first and a second end and having a width substantially equal to the width of the film. A second member cooperates with the extending portion of the frame member to form the lower portion of the film guide track. A cartridge holding nest is arranged to accept the supply chamber of the cartridge with the takeup chamber supported by the upper portion of the film guide track and with the cartridge aperture disposed across the first end of the film guide track. A film guide roller is rotatably mounted on a shaft extending perpendicular to the plate-like frame member with a first portion of the periphery of the roller disposed substantially tangentially to the first end of the film guide track and a second portion of the periphery substantially opposite from said first portion disposed in the exposure aperture adjacent the web opening in a takeup chamber of a cartridge in said cartridge holding nest. The film guide roller has an axially centrally disposed peripheral recess. The upper portion of the first end of the film guide track has a curved portion extending into the peripheral recess in the film guide roller. A paper release arm is pivotally mounted on the frame member for movement parallel to the frame member and has a curved finger member disposed at the end opposite from the pivotal mounting. The release arm is movable from a first position remote from the first end of the film guide track to a second position with the curved finger disposed across the first end of the film guide track with the surface of the finger member adjacent and spaced from the guide roller a distance substantially equal to the combined thickness of the film and backing paper. A spring means is arranged to hold the paper release arm in either of the first and second positions. The lateral edges of the first end of the lower portion of the film guide track are arranged to extend beyond the finger member when the paper release arm is in the second position whereby the distance between the lateral edges at the adjacent surface of the finger member is less than the width of the film. A film-receiving reel holding means is mounted on said frame member and is arranged to releasably hold the reel in alignment with the second end of the film guide track. The second end of the lower portion of the guide track is arranged to guide film passing through the guide track into the reel. The paper release arm is arranged, after a film cartridge is disposed in the cartridge holding nest, to be moved from the first position to the second position with the finger member passing through the window opening in the back member of the cartridge and to engage the backing paper extending across the aperture opening. The finger member, upon movement through said window opening, withdraws the end of the backing paper from the supply chamber and moves the backing paper around the film guide roller with the end of said backing paper disposed below the lower portion of the film guide track. The paper release arm is arranged in the second position to retain a film cartridge in the cartridge nest. Thereafter, a tensile force on the end of the backing paper causes the interwound film in the takeup chamber to be pulled therefrom around the film guide roller into the film guide track and then into the film-receiving reel.

The present invention may be practiced in conjunction with a double-chambered film cartridge having an unobstructed exposure aperture intermediate the cartridge chambers and wherein, prior to presentation for film removal, the trailing film end lies within a takeup chamber passageway and the trailing portion of an interwound backing strip extends from the passageway and is disposed within the exposure aperture.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

FIG. 1 is a perspective view of a film cartridge useable in conjunction with the instant invention;

FIG. 2 is a bottom view of the cartridge of FIG. 1;

FIGS. 3, 4 and 5 are cross-sectional views of a cartridge taken along line 3—3 of FIG. 1 and depicting a sequence of steps in removing film according to the present invention;

FIG. 6 illustrates a preferred embodiment of apparatus according to the present invention;

DESCRIPTION OF A PREFERRED EMBODIMENT

Figure 7:
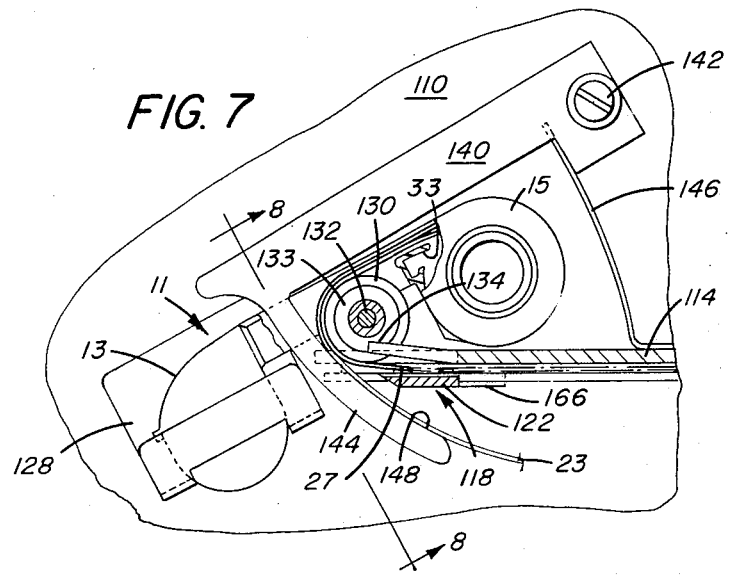
FIG. 7 is another illustration, partly in section, of the present invention with a cartridge in position and the film partially removed.

In FIG. 1 there is shown a film cartridge 11 having spaced-apart supply and takeup chambers 13 and 15, which are interconnected by a channel defined by a cartridge back wall member 17 and parallel side rails 19, 19'. The walls of chambers 13 and 15 in combination with side rails 19 and 19' cooperate to form a generally rectangular exposure aperture 21 wherein successive film image areas may be sequentially exposed when the cartridge is in use in a camera. The cartridge 11 further includes a rectangular backing strip window 25 formed in the back wall 17 by means of which window exposure identification numbers (not shown) printed on the back side of a backing strip 23 may be viewed by the photographer. The cartridge takeup chamber 15 contains a rotatably mounted takeup core 24 engageable by a core drive mechanism of a camera (not shown).

In use, a photographic element comprised of a photosensitive film strip 27 superimposed upon the backing material strip 23 (which may, for example, be a light-impervious paper strip) is initially housed within supply chamber 13. One end of the element initially extends through a supply chamber access opening 29, across exposure aperture 21 and into takeup chamber 15 via a takeup chamber access opening 31 and is secured to takeup core 24. As described in copending U.S. application Ser. No. 25,848 now U.S. Pat. No. 3684206, entitled FILM CARTRIDGE AND PHOTOGRAPHIC WEB FOR USE THEREWITH and filed on Apr. 6, 1970 in the name of Evan A. Edwards, the photographic element may be attached to the core solely by means of backing strip 23. The film 27 thus need not be attached at any point to either the core 24 or to the backing strip 23 but may instead be in frictional contact only with strip 23. During use in a camera, rotation of core 24 by the camera drive mechanism draws the photographic element past the exposure aperture 21 and into takeup chamber 15 wherein it is wound around core 24 to form an interwound roll comprised of alternate convolutions of film and backing material.

Upon use of the last film image area, the photographic element may be advanced by the camera mechanism an additional distance sufficient to cause the end 27' (hereinafter referred to as the trailing end) of film strip 27 to enter the takeup chamber access opening 31. In accordance with a preferred embodiment of the invention the trailing film end 27' may be retained (as shown in FIG. 3) within a narrow passageway cooperatively formed in the takeup chamber 15 by a lip member 33 and an opposing surface of the back wall 17. Such retention may, for example, be accomplished by the invention described in U.S. Pat. No. 2,559,892 or, desirably, by the invention described in copending U.S. application Ser. No. 63,879, now U.S. Pat. No. 3,695,160 entitled FILM CARTRIDGE FOR PREVENTING THE END OF A FILMSTRIP FROM ENTERING A CARTRIDGE CHAMBER and filed on August 14, 1970 in the name of Willis Stockdale. As shown in FIG. 3, when the trailing film end 27' has entered takeup chamber 15 the backing material strip or paper 23, because of its longer length has its trailing end disposed within supply compartment 13. A segment of backing material strip thus lies across exposure aperture 21 (and across window 25) upon the completion of strip advancement.

As shown in FIG. 2, exposure aperture 21 forms an unobstructed opening having a width, as measured between parallel rails 19 and 19', which is greater than the widths of either the film 27 or the backing material 23. In accordance with a preferred method of practicing the invention the backing material 23 is first dislodged from the exposure aperture as by inserting a suitably slender probe 144 through the window 25 as shown in FIG. 4.

Once the backing strip 23 is dislodged from the aperture 21, it may be grasped manually or by suitable means such as, for example, a pair of pinch rollers 37, 37'. Backing strip 23 is then withdrawn from the takeup chamber 15. It has been found that such withdrawal of the backing strip 23 causes film strip 27 to likewise be withdrawn from the takeup chamber as shown in FIG. 5. Such film strip withdrawal occurs even though, as previously set forth, the film strip 27 is only in frictional contact with the backing strip 23 and is not otherwise engaged.

Referring now to FIG. 6, a preferred embodiment of a cartridge stripper of the present invention comprises a plate-like frame member 110 having a pistol-grip-shaped hand grip 112 at one corner. A portion 114 of the frame member is bent substantially perpendicular to the plane of the plate-like portion to form the upper portion of a film guide track 116 which has a first and a second end generally indicated at 118 and 120. The track width is substantially equal to the width of the film. A second track portion 122 cooperates with the extending portion 114 of the frame member to form the lower surface of the film guide track and is connected thereto by a pair of spacer rails 123. A cartridge holding nest 128 is mounted on the surface of frame member 110 adjacent the first end 118 of the film guide track. The nest 128 is arranged to accept the supply chamber 13 of a cartridge 11 with the takeup chamber 15 being supported on the upper surface of the upper portion 114 of the film guide track with the cartridge aperture disposed across the first end 118 of the film guide track. While the film track is illustrated in a horizontal orientation with the cartridge extending at an angle across the end thereof, the specific arrangement of these elements is not critical so long as other relationships described below are maintained. Moreover, while the frame member is illustrated and described as being generally vertically oriented, the present apparatus would operate equally well if the frame member were disposed horizontally or at some angle thereto.

A film guide means or roller 130 is rotatably mounted on a generally horizontal shaft 132 extending perpendicular to the plate-like frame member 110 with a first portion of the periphery of the roller disposed substantially tangentially to the first end 118 of the film guide track 116 and a second portion of the periphery substantially opposite from the first portion disposed in the exposure aperture adjacent the web opening in the takeup chamber of a cartridge 11 in the cartridge holding nest 128. The film guide roller is provided with an axially centrally disposed peripheral recessed groove 133 (see FIGS. 8 and 9) into which a curved portion 134 of the end of the upper portion of the film guide track 116 extends.

Figure 9:
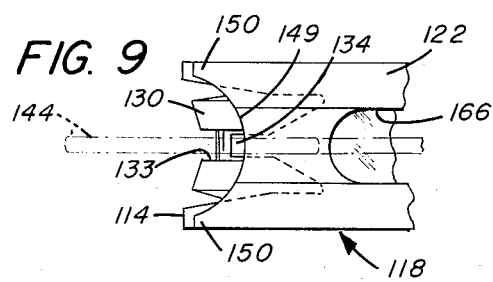
FIG. 9 is a partial view of the present apparatus taken along line 9—9 of FIG. 8.

A paper release arm 140 is pivotally mounted at 142 on the frame member 110 for movement parallel thereto. A curved finger member 144 is provided at the end of the arm opposite to the mounting 142. A spring member 146 is arranged to hold the arm 140 either in a first position (shown in phantom at 145 in FIG. 6) remote from the first end 118 of the film guide track or a second position (shown in FIG. 7) with the curved finger 144 disposed across the first end 118 of said film guide track and with the surface 158 of the member adjacent the guide roller 130. The curved finger member is aligned with the axial centerline of the guide roller, as shown in FIGS. 8 and 9, and is spaced from the surface thereof a distance substantially equal to the combined thickness of the film and the backing paper in the film cartridge. The first end of the lower portion of the film guide track is curved, as at 149 in FIG. 9, whereby the lateral edges 150 extend beyond the finger member 144 when the paper release arm 140 is in the second position. The lateral edges are arranged so that the distance therebetween at the finger member is less than the width of the film, as will be more thoroughly described hereinbelow.

Means including a spring 160 and post 162 are provided on the frame member 110 and are arranged to releasably hold a film-receiving reel 164 (shown in phantom in FIG. 6) in alignment with the second end 120 of said film guide track. The film receiving reel 164 is preferably of the type wherein the flanges are provided with spiral grooves into which the film may be fed from the end of the film guide track. The lower portion of the second end of the guide track is formed at 165 to guide film passing through the guide track into the film receiving track of the reel 164. The reel may be provided with a recess, not shown, in one flange which mates with the post 162 to provide simple alignment of the reel by an operator in the dark.

Figure 8:
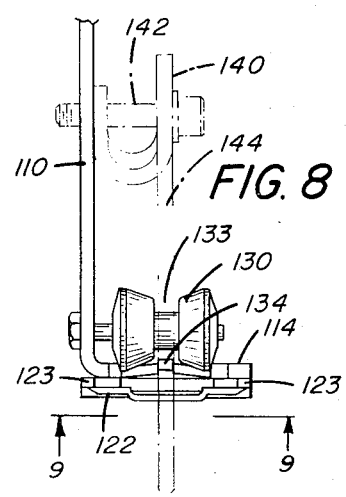
FIG. 8 is a partial sectional view of the present apparatus taken along line 8—8 of FIG. 7.

The first end 118 of the film guide track is preferably beveled, as shown in FIG. 7, to conform to the film and paper path from the cartridge takeup chamber. This path coincides for the paper and film from the takeup chamber to the first end of the track as shown in FIG. 7. As shown in FIG. 9, the lower portion of the guide track may be provided with an aperture 166 which provides access to the lower surface of the film in the guide track so that it may be moved, as by a drive roll, not shown.

In operation, a film cartridge 11 is positioned with the supply chamber 13 in the cartridge holding nest 128. The paper release arm 140, which is initially in the first position 145, is moved to the second position shown in FIG. 7 whereby the curved finger member 144 passes through the window opening 25 in the back member of the cartridge and engages the backing paper 23 extending across the aperture opening and withdraws the end thereof from the supply chamber 13. The finger member moves the backing paper around the film guide roller 130, with the end of said backing paper that is removed from the supply chamber being moved to below the lower portion of the film guide track 116. In the second position, the paper release arm 140 is arranged to retain the film cartridge 11 in the cartridge nest during the remaining operations. Thereafter, a tensile force is applied to the end of the backing paper 23, either by manually grasping or by mechanically engaging the paper, and the paper is pulled out of the takeup chamber 15 causing the interwound film in the takeup chamber to be pulled therefrom around the film guide roller 130 into the film guide track 116 and then into the film-receiving reel 164.

The film and paper pass around the guide roller 130 and between the curved finger 144 to the first end of the film guide track. The paper does not enter into the guide track as it is initially withdrawn from the supply chamber 13 because the end of the paper remains on the opposite side of the finger until it is below the end of the track. The film, however, does not approach the end of the track until the paper is pulled, after the paper release arm is in the second position and after the paper extends between the finger and the end of the guide track. As the film follows the path between the finger and the guide roller 130 it contacts the lower portion of the end of the guide track at the curved surface 149 where the distance between the lateral edges 150 is less than the width of the film. The transverse stiffness of the film and the natural tendency of the film to curl longitudinally after being wound in the supply and takeup chambers of the cartridge, cooperate to assure that the film enters the end of the guide track to be fed to the reel 164. Similarly, the cooperation of the curved finger portion 134 of the first end of the upper portion of the guide track and the groove 133 in guide roller 130 assure that the film does not follow the roller around and over the top of the guide track. Moreover, as can best be seen in FIG 7, the guide roller 130 is arranged with respect to the web opening to the takeup chamber so that the film, in passing around the roller, is lifted away from the lip 33 so that the film will not be damaged by contact therewith as it is withdrawn from the takeup chamber.

While the preferred embodiment of the present invention is arranged to be hand-held, it will be apparent that the frame member may be permanently mounted to a suitable support. Likewise, the second end of the film guide track can be extended so that the end of the film can be fed to a splicing station rather than to reel 164, so that the film can be spliced to other strips to film for processing in substantially a continuous length.

While the operation of the film stripper has been described as pulling the trailing end of the backing paper from the supply chamber, it will also successfully operate even if, for some reason, the end of the backing paper is jammed in the supply chamber. In this instance the paper will be pulled from the takeup chamber as the finger member passes through the window opening in the back of the cartridge.

Accordingly, it will be seen that the present invention provides a simple, effective apparatus for withdrawing exposed film from a cartridge without damaging the film. Moreover, the present apparatus may be easily operated in complete darkness since the film and the cartridge are held by the apparatus during and after stripping. Still further, the film is simply and automatically fed to a film guide track and then to a processing reel or to a splicing station.

The invention has been described in detail with particular reference to a preferred embodiment thereof, but it will be understood that variations and modifications can be effected within the spirit and scope of the invention.

We claim:

1. Apparatus for withdrawing from a chamber of a cartridge a strip of film interwound with a strip of backing material, said apparatus comprising film guide track means, means for holding said cartridge adjacent one end of said track means, film guide means for residing between said cartridge and said one end of said track means, and means, including a pivotable member operable to engage said backing material, for so positioning said backing material with respect to said film guide means and to said one track means end that said film may be withdrawn from said cartridge and guided to said track means in response to a tensile force applied to said backing material.

2. The invention according to claim 1 wherein said pivotable member is movable between a position adjacent said film guide means and said one end of said track means and a position remote therefrom.

3. Apparatus for withdrawing from a chamber of a cartridge a strip of film interwound with a strip of backing material, said apparatus comprising film guide track means, means for holding said cartridge adjacent one end of said track means, film guide means for residing between said cartridge and said one end of said track means and comprising a roller with a portion of the periphery thereof disposed substantially tangentially of said one end of said track means, and means for so positioning said backing material with respect to said film guide means and to said one track means end that said film may be withdrawn from said cartridge and guided to said track means in response to the application of a tensile force to said backing material.

4. The invention according to claim 3 wherein said cartridge is held in said apparatus adjacent the periphery of said roller.

5. The invention according to claim 2 wherein said pivotable member, when in said adjacent position, is operable to so engage said cartridge as to resist movement of said cartridge away from said film guide means.

6. The invention according to claim 3, wherein a portion of the peripheral surface of said roller is recessed radially with respect to the axis of rotation of said roller.

7. The invention according to claim 6 wherein said film guide track means includes means arranged to be received within said recessed portion to direct said film from said roller to said guide track means.

8. The invention according to claim 7 including means for releasably holding a film receiving reel in alignment with a second end of said track means.

9. The invention of claim 3 wherein said cartridge chamber includes an access passageway defined in part by a lip member positioned to engage film disposed within said passageway, and wherein said cartridge holding means is further adapted to so position said cartridge with respect to said roller that film being withdrawn from said chamber via said passageway will be supported by said roller and out of contact with said lip member.

10. A photographic film cartridge stripper arranged to remove exposed photographic film from a cartridge having a supply chamber and a takeup chamber disposed at opposite ends of an exposure aperture and connected by a back member which extends across the rear of the exposure aperture, said cartridge aperture having an unobstructed opening wider than the width of said film and said back member having a window opening therethrough, said supply and takeup chambers each having a web opening therefrom adjacent said back member into said aperture, said cartridge having a film backing paper interwound with said exposed film in the takeup chamber with only the backing paper extending across said aperture opening to said supply chamber, said cartridge stripper comprising a plate-like frame member, a film guide track having a first and a second end and having a width substantially equal to the width of said film mounted on said frame member, a cartridge holding nest arranged to accept a cartridge with the aperture thereof disposed across the first end of said film guide track, a film guide roller rotatably mounted on said plate-like frame member with a first portion of the periphery of the roller disposed substantially tangentially to the first end of said film guide track, a paper release arm pivotally mounted on said frame member for movement parallel to said frame member and having a curved finger member disposed at the end opposite from said pivotal mounting, said release arm being movable from a first position remote from said first end of said film guide track to a second position with said curved finger disposed across the first end of said film guide track wih the surface of said finger member adjacent said guide roller being spaced therefrom a distance substantially equal to the combined thickness of said film and said backing paper, said paper release arm arranged, after a film cartridge is disposed in said cartridge holding nest, to be moved from the first position to the second position with said finger member passing through said window opening in the back member of the cartridge and engaging the backing paper extending across the aperture opening, said finger member upon movement through said window opening withdrawing the end of the backing paper from said supply chamber and moving the backing paper around the film guide roller with the end of said backing paper disposed below the lower portion of said film guide track, whereupon a tensile force on the end of said backing paper causes the interwound film in said takeup chamber to be pulled therefrom around said film guide roller into said film guide track.

11. The invention according to claim 10 wherein said cartridge holding nest is arranged to accept the supply chamber of a cartridge.

12. The invention according to claim 10 wherein a second portion of the periphery of said film guide roller is disposed in the exposure aperture of a cartridge in said cartridge holding nest.

13. The invention according to claim 12 wherein said roller is disposed adjacent the web opening in the cartridge takeup chamber.

14. The invention according to claim 13 wherein said first and second portions of the roller periphery are substantially diametrically opposite.

15. The invention according to claim 10 wherein said film guide roller has an axially centrally disposed peripheral recess.

16. The invention according to claim 15 wherein the upper portion of the first end of said film guide track has a curved portion extending into the peripheral recess in said film guide roller.

17. The invention according to claim 10 wherein the lateral edges of the first end of the lower portion of the film guide track are arranged to extend beyond said finger member when said paper release arm is in the second position whereby the distance between the lateral edges at the finger member is less than the width of the film.

18. The invention according to claim 10 including means mounted on said frame membdr for releasably holding a film-receiving reel in alignment with the second end of said film guide track.

19. A photographic film cartridge stripper and reel loader arranged to remove exposed photographic film from a cartridge having a supply chamber and a takeup chamber disposed at opposite ends of an exposure aperture and connected by a back member which extends across the rear of the exposure aperture, said cartridge aperture having an unobstructed opening wider than the width of said film and said back member having a window opening therethrough, said supply and tekeup chambers each having a web opening therefrom adjacent said back member into said aperture, said cartridge having a film backing paper interwound with said exposed film in the takeup chamber with only the backing paper extending across said aperture opening to said supply chamber, said cartridge stripper comprising a plate-like frame member having a hand grip at one extremity thereof, said frame member having a portion extending substantially perpendicular to the plate-like portion to form the upper portion of a film guide track having a first and a second end and having a width substantially equal to the width of said film, a second member cooperating with said extending portion of said frame member to form the lower portion of said film guide track, a cartridge holding nest arranged to accept the supply chamber of said cartridge with the takeup chamber supported by the upper portion of said film guide track and the cartridge aperture disposed across the first end of said film guide track, a film guide roller rotatably mounted on a shaft extending perpendicular to said plate-like frame member with a first portion of the periphery of the roller disposed substantially tangentially to the first end of said film guide track and a second portion of the periphery substantially opposite from said first portion disposed in said exposure aperture adjacent said web opening in a takeup chamber of a cartridge in said cartridge holding nest, said film guide roller having an axially centrally disposed peripheral recess, said upper portion of the first end of said film guide track having a curved portion extending into the peripheral recess in said film guide roller, a paper release arm pivotally mounted on said frame member for movement parallel to said frame member and having a curved finger member disposed at the end opposite from said pivotal mounting, said release arm being movable from a first position remote from said first end of said film guide track to a second position with said curved finger disposed across the first end of said film guide track with the surface of said finger member adjacent said guide roller being spaced therefrom a distance substantially equal to the combined thickness of said film and said backing paper, spring means arranged to hold said paper release arm in either of said first and second positions, the lateral edges of said first end of the lower portion of said film guide track arranged to extend beyond said finger member when said paper release arm is in the second position whereby the distance between the lateral edges at said adjacent surface of said finger member is less than the width of said film, and means mounted on said frame member arranged to releasably hold a film-receiving reel in alignment with the second end of said film guide track, the second end of the lower portion of said guide track arranged to guide film passing through said guide track into said reel, said paper release arm arranged, after a film cartridge is disposed in said cartridge holding nest, to be moved from the first position to the second position with said finger member passing through said window opening in the back member of the cartridge and engaging the backing paper extending across the aperture opening, said finger member upon movement through said window opening withdrawing the end of the backing paper from said supply chamber and moving the backing paper around the film guide roller with the end of said backing paper disposed below the lower portion of said film guide track, said paper release arm arranged in said second position to retain a film cartridge in said cartridge nest, whereupon a tensile force on the end of said backing paper causes the interwound film in said takeup chamber to be pulled therefrom around said film guide roller into said film guide track and then into said film-receiving reel.

* * * * *